INVENTORS
BROOKS E. NELSON AND
BY RUBEN O. PETERSON
Oberlin + Limbach
ATTORNEYS

March 15, 1960 B. E. NELSON ET AL 2,928,112
BRUSHING MACHINE
Filed May 27, 1955 6 Sheets-Sheet 2

INVENTORS
BROOKS E. NELSON AND
BY RUBEN O. PETERSON

Oberlin + Limbach
ATTORNEYS

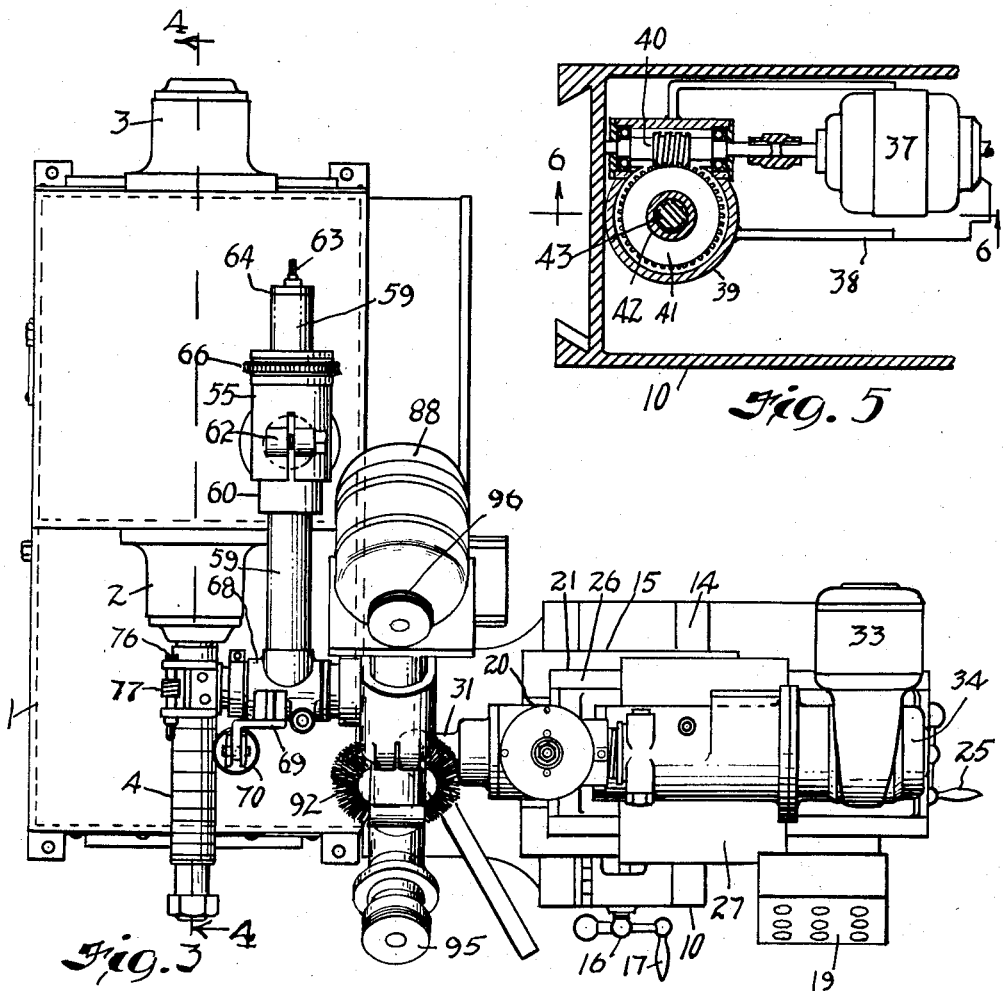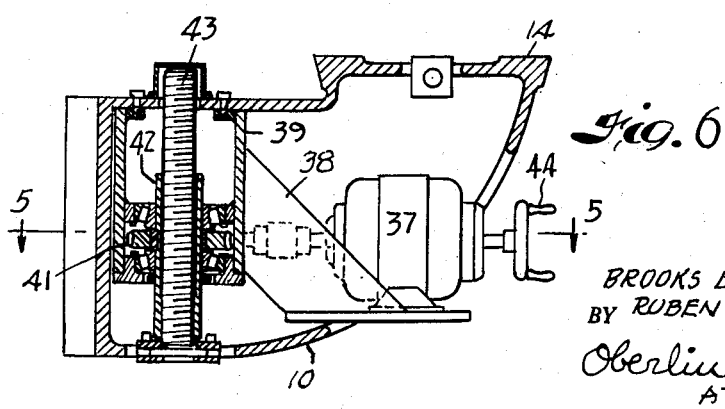

March 15, 1960  B. E. NELSON ET AL  2,928,112
BRUSHING MACHINE
Filed May 27, 1955  6 Sheets-Sheet 5
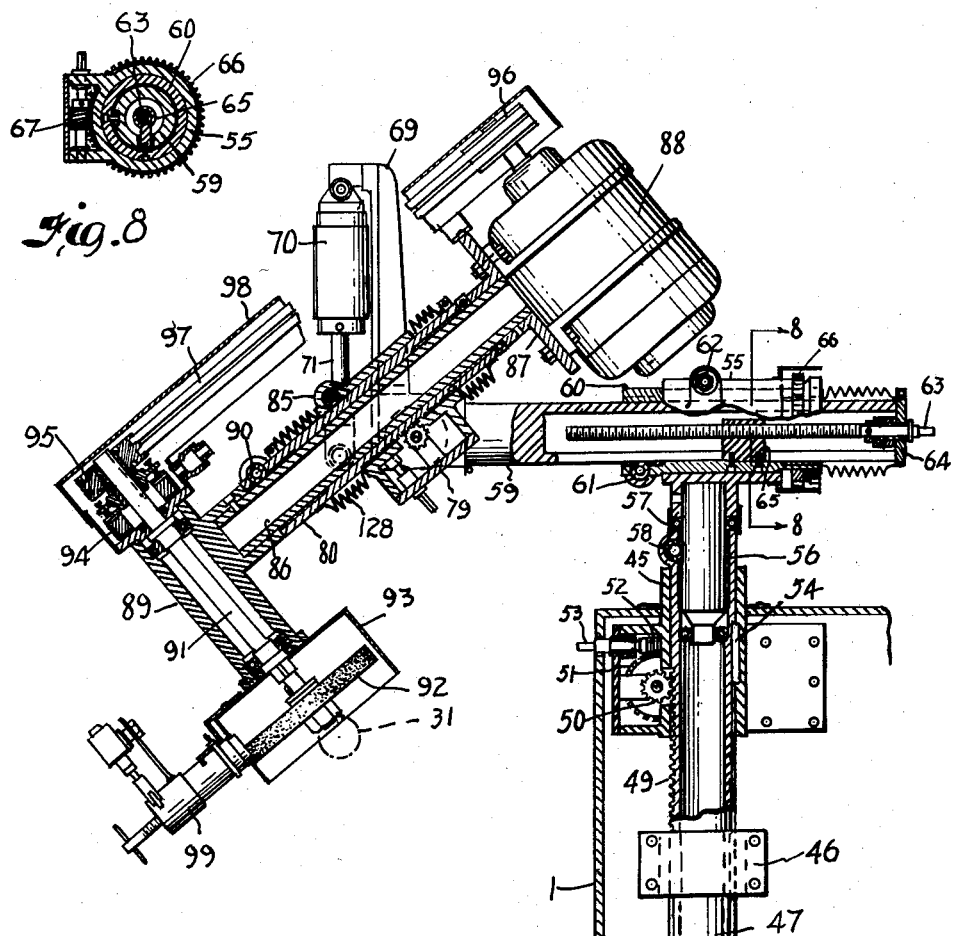
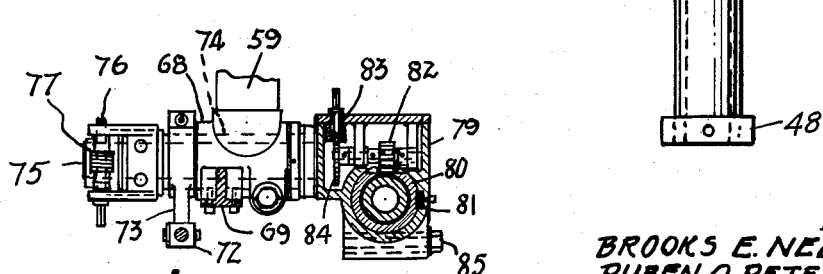
INVENTORS
BROOKS E. NELSON AND
RUBEN O. PETERSON
BY Oberlin + Limbach
ATTORNEYS.

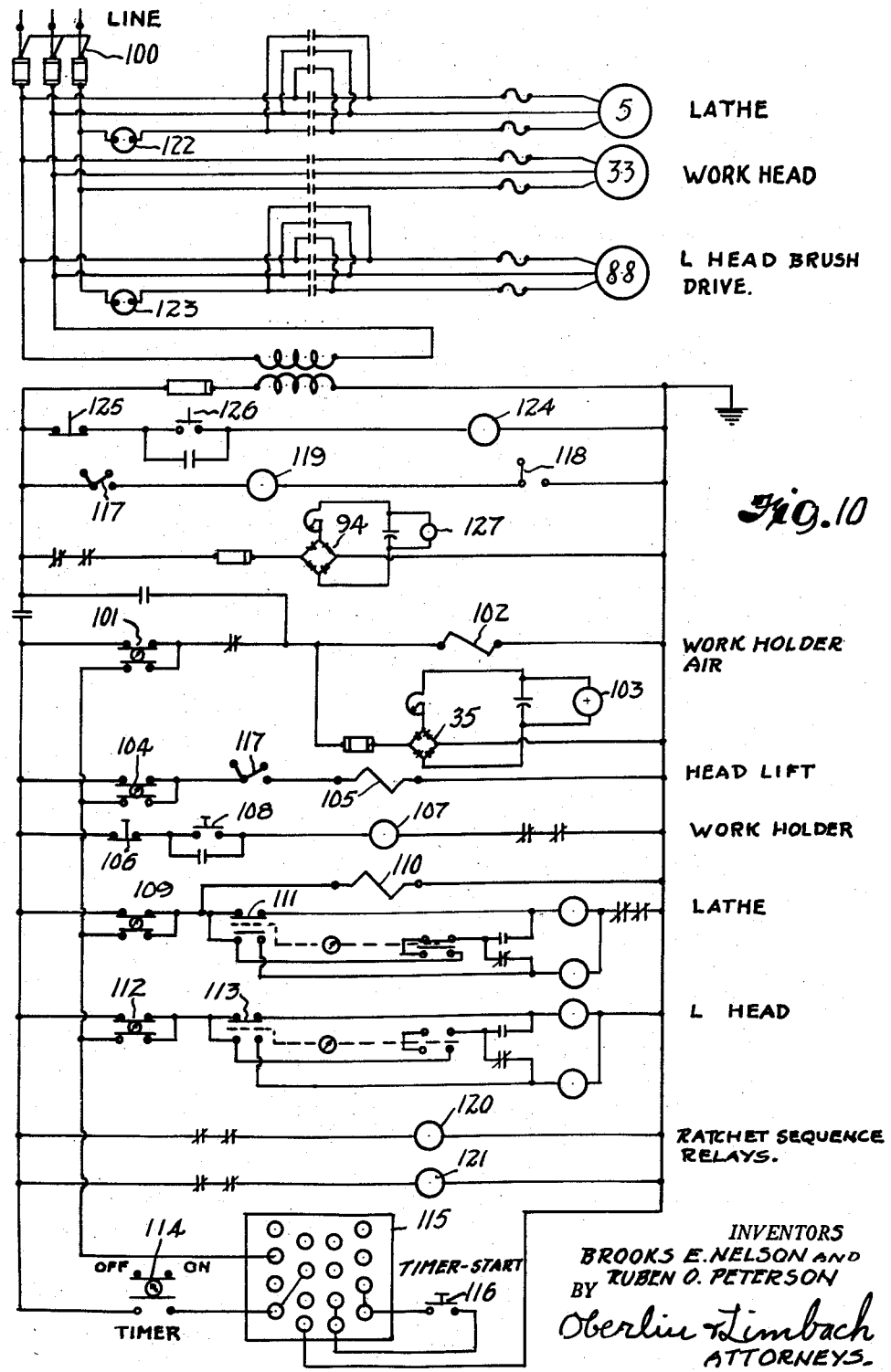

United States Patent Office 2,928,112
Patented Mar. 15, 1960

2,928,112
BRUSHING MACHINE

Brooks E. Nelson, Chagrin Falls, and Ruben O. Peterson, University Heights, Ohio, assignors to The Osborn Manufacturing Company, Cleveland, Ohio, a corporation of Ohio Application May 27, 1955, Serial No. 511,505

14 Claims. (Cl. 15—21)

This invention relates as indicated to a novel brushing machine, and more particularly to a semi-automatic machine operative to present work-pieces to power driven rotary brushes and optionally also to move other power driven brushes into and out of work-engaging position. In several respects, this new machine represents a further improvement of the universal work-piece holder described and claimed in Nelson et al. Patent 2,682,065.

Certain items such as gears, clutch plates, large washers, etc., are produced in large quantities and present problems of surface-finishing and burr removal which have in the past necessitated considerable manual handling and have not always resulted in the obtaining of consistent treatment. It has often been necessary to perform a series of sequential operations upon such work-pieces with a consequent relatively high labor cost.

It is accordingly a principal object of our invention to provide a machine operative to handle work-pieces of the nature indicated in an automatic or semi-automatic manner and to perform a plurality of brushing operations thereon without further manual intervention.

Another object of our invention is to provide a machine wherein the work-piece may be positioned as desired for intermittent presentation to one power driven rotary brush, or set of such brushes, while also providing an additional power driven rotary brush or brushes mounted for intermittent movement into and out of work-engaging position.

It is a further object to provide a machine of the nature indicated wherein the work-piece is automatically brought into and retracted from operating position and movement of such work-piece and also of the brushes automatically stopped when the work-piece has been thus brought into retracted position.

Yet another object is to provide control means whereby such rotary brushes may be thus automatically stopped and next driven in the opposite direction of rotation when the succeeding work-piece is advanced relatively thereto.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 3 is a top plan view of such machine;

Fig. 5 is a horizontal section taken on the line 5—5 on Fig. 6 showing optional power drive means for the vertical slide supporting the work-carrying mechanism as shown in Fig. 2;

Fig. 6 is a vertical section taken on the line 6—6 on Fig. 5;

Fig. 7 is a vertical elevation, partly broken away, on an enlarged scale, of the oscillating brush head and support therefor as shown in Fig. 1;

Fig. 8 is a transverse section taken on the line 8—8 on Fig. 7;

Fig. 9 is a fragmentary horizontal section taken on the line 9—9 on Fig. 2; and

Fig. 10 is a schematic diagram of the electrical control system.

Figure 1:
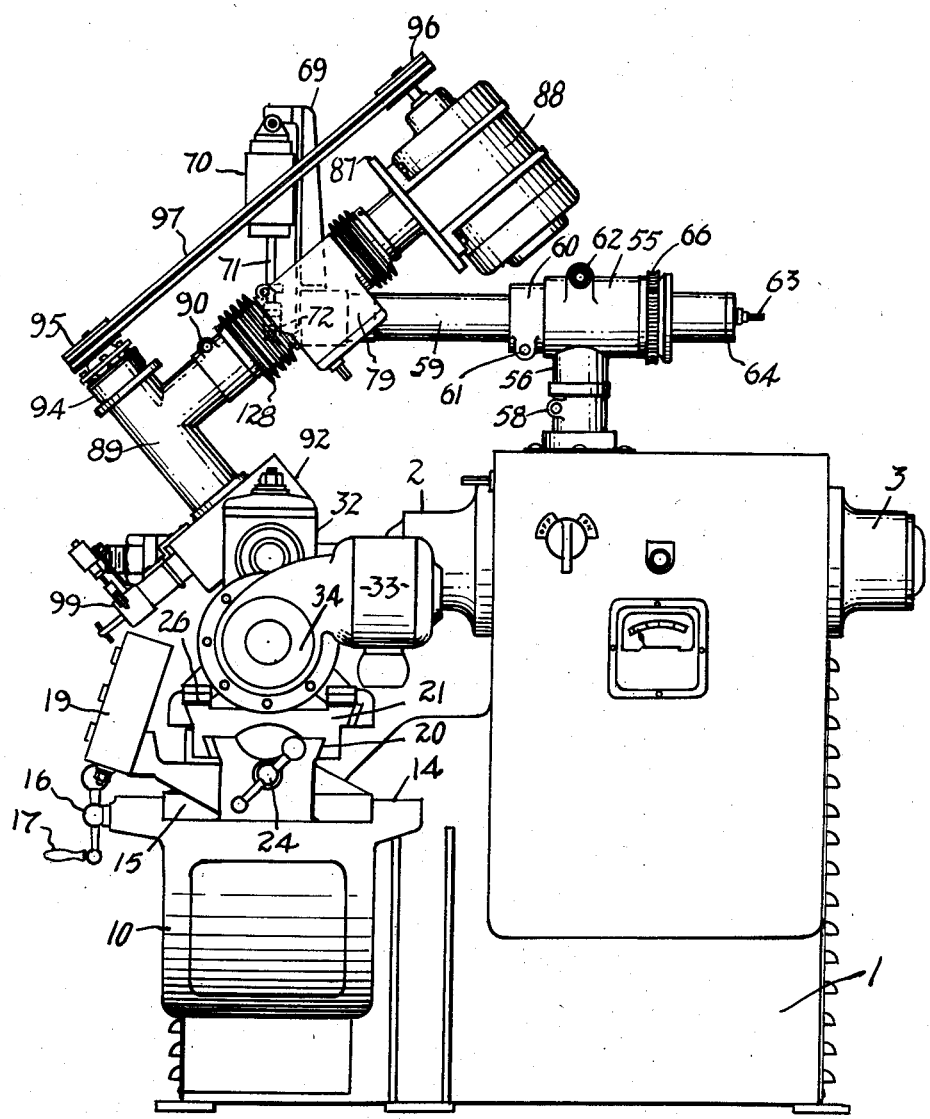
Fig. 1 is a front elevational view of our new machine including the optional oscillating brush head mounted thereon.

Referring now more particularly to said drawing and especially Figs. 1–4 thereof, the embodiment of our invention there illustrated comprises a main box frame or housing 1 on which are mounted large aligned external bearings 2 and 3 journaling brush arbor 4 therein. An electric motor 5 is adjustably mounted within such housing, which is louvered for ventilation, and is adapted to drive arbor 4 through pulleys 6 and 7 connected by V-belts 8. A pneumatic brake 9 is operative to bring the brush arbor to a quick stop when energized at proper timed intervals, as explained more in detail below.

A slide 10 is mounted for adjustment on vertical ways 11 secured to the side of base housing 1. In the embodiment illustrated in Figs. 1–4 inclusive, a vertical rod 12 threadedly engages nut 13 held against rotation in such slide so that when a hand crank is secured to the upper end of such shaft and the shaft rotated, slide 10 is caused to rise or drop as desired.

The upper surface of slide 10 is provided with crossways 14 on which is gibbed a transversely adjustable platform 15. An adjusting screw 16 having a hand crank 17 secured thereto is threadedly engaged in both vertical slide 10 and a depending tongue or bracket 18 on platform 15 in order that the latter may be adjustably positioned transversely of vertical slide 10 and parallel to arbor 4. It will thus be appreciated that such platform may likewise be adjusted relative to the rotary brushes mounted on such arbor. A push button control panel 19 is mounted on a bracket on platform 15 where it will be conveniently accessible to the operator.

Platform 15 is itself provided with horizontal ways 20 at right angles to ways 14 and a slide 21 is mounted thereon for reciprocation toward and away from arbor 4. A horizontally disposed pneumatic cylinder 22 is mounted within slide 21. A nut 23 mounted on the underside of slide 21, and thereby held against rotation, threadedly engages adjusting screw 24 which likewise threadedly engages platform 15 so that rotation of such screw by means of hand crank 25 is operative to reciprocate slide 21 and cylinder 22 generally toward and away from brush arbor 4.

Slide 21 is in turn provided with horizontal ways 26, parallel to ways 20, upon which carriage 27 is mounted, such carriage being provided with a depending bracket 28 secured to the end of piston rod 29 emerging from cylinder 22, whereby such carriage may be reciprocated toward and away from arbor 4. Such carriage 27 comprises an intermediate body portion within which is journaled drive shaft 30 operative in turn to drive the work-carrying spindle 31 mounted within universal head 32 whereby such spindle may be adjustably positioned relative to arbor 4. Universal heads of the type indicated are well known in the art, one form being described more in detail in our prior Patent 2,682,065. An electric motor 33 is operative to drive shaft 30 through gear reduction unit 34 and magnetic clutch 35. It will thus be seen that when the work-piece has been chucked on the end of rotatable spindle 31 (a magnetic chuck may be used, for example), then slide 10 may be elevated and the platform 15 shifted laterally to bring carriage 27 into the desired position for reciprocation toward and away from the brush 36 mounted on arbor 4 (the outline of such brush is merely indicated in dotted line on Fig. 2 to avoid obscuring other portions of the mechanism). Slide 21 is then adjusted toward and away from arbor 4 to determine the best starting position or retracted position of carriage 27 and the work-piece held thereon. As viewed in Fig. 2, it will be noted that slide 21 and cylinder 22 are in fully retracted position, and carriage 27 is shown advanced through action of the piston-cylinder assembly toward arbor 4 and brush 36. When the brushing operation has been concluded, such piston-cylinder assembly will be actuated to retract carriage 27 to bring the work-piece away from the brush into position for safe removal and replacement by the operator.

Now referring to Figs. 5 and 6 of the drawing, in the modification there illustrated a reversible electric motor 37 is mounted on a bracket 38 suspended from a well 39 secured to the upper portion of vertical slide 10. Such motor is adapted to drive a worm 40 engaging a worm gear 41 keyed to a sleeve 42 which at its lower end threadedly engages a vertical screw 43 (replacing screw 12), the lower end of such screw being secured against rotation and mounted on the base of the machine. A hand wheel 44 is also provided for manual adjustment when desired. Accordingly, major adjustments in the vertical positioning of slide 10 may conveniently be push button controlled and final exact adjustments may be made manually.

Figure 2:
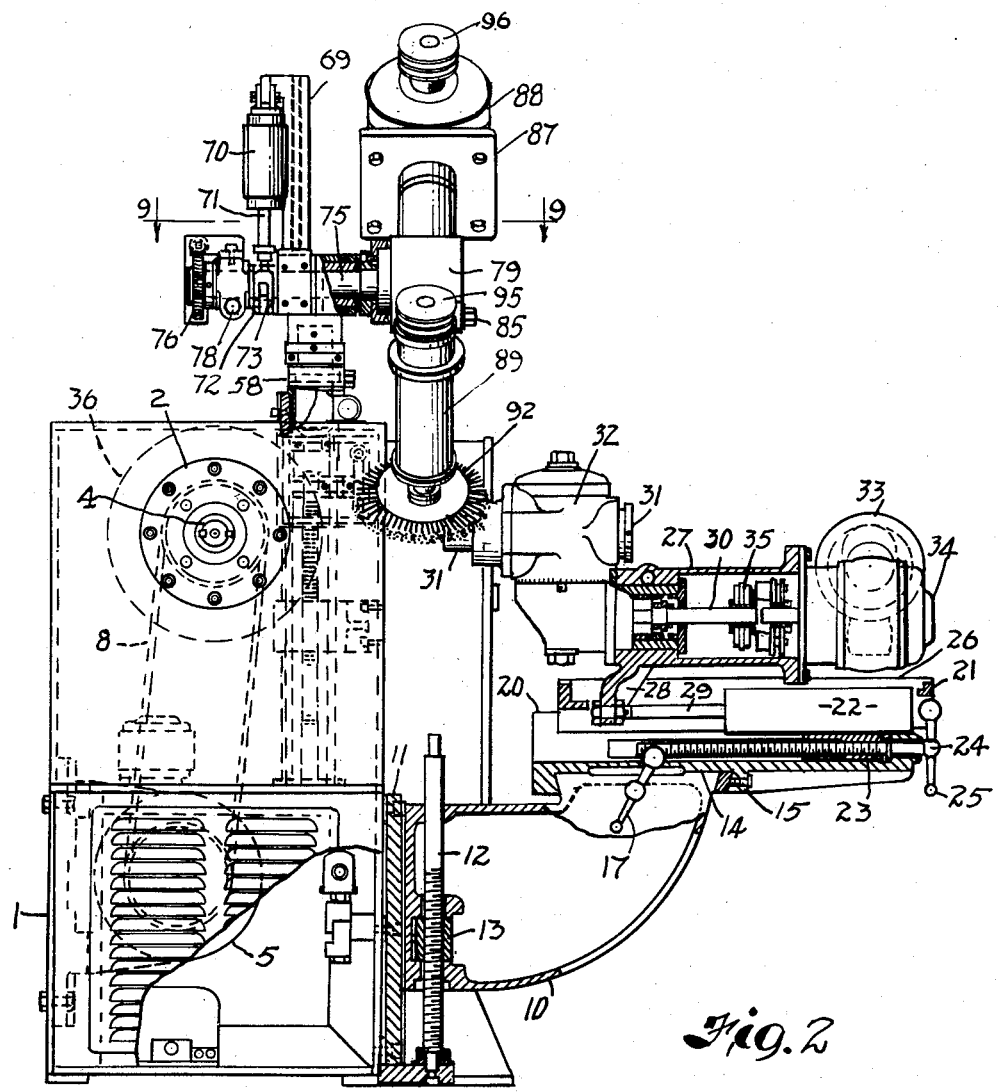
Fig. 2 is a side elevation of such machine with a portion of the work holding means broken away better to disclose the means for adjusting and reciprocating the same.
Figure 4:
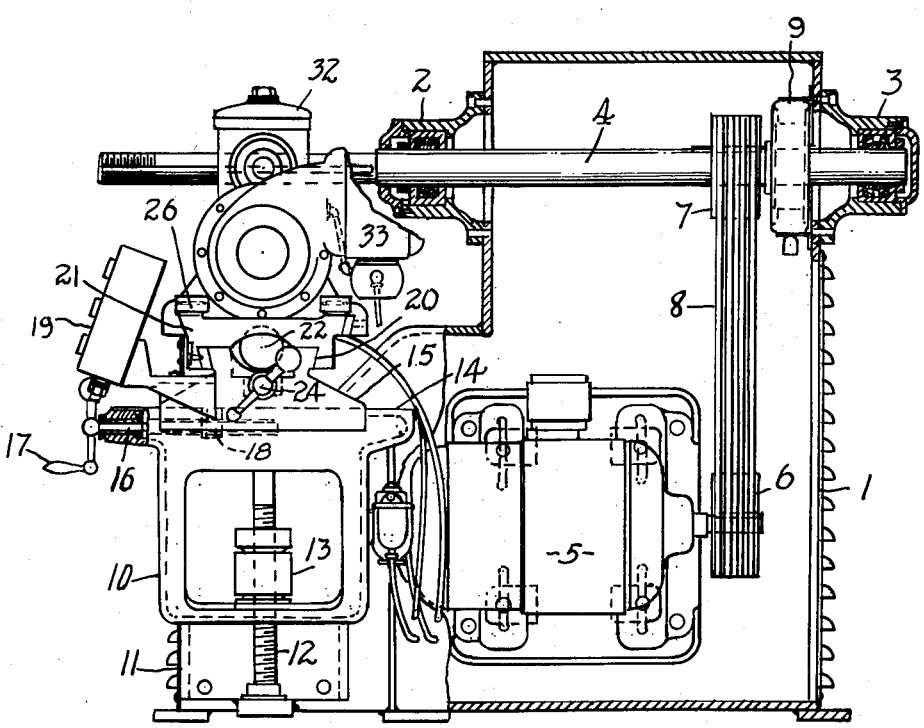
Fig. 4 is a fragmentary front view of the base portion of the machine with the brush arbor housing taken in section on the line 4—4 on Fig. 3.

Referring further to Figs. 1, 2 and 3, and more especially also to Figs. 7, 8 and 9, we also provide an optional brushing head adapted to present an additional power driven rotary brush to the work in a different angular relationship than brush or brushes 36 on arbor 4 so that a plurality of quite dissimilar brushing operations may be performed upon the work-piece simultaneously. Such additional brushing head is mounted for adjustment to a wide variety of different work-engaging positions and is also operative automatically to swing clear of the work ordinarily prior to retraction of carriage 27.

Having particular reference to Fig. 7 of the drawing, a well 45 is provided in the upper deck of housing 1 aligned with a lower bracket 46 adapted together to receive a vertical tubular column 47. Such column is provided with a stop ring 48 at its lower end and with rack teeth 49 along one side engaged by a pinion 50 adapted to be driven through gear 51 and worm 52 turned by means of a removable crank (not shown) keyed to the end of worm shaft 53. In this manner, column 47 may be raised and lowered as desired, being illustrated in lowermost position in Fig. 7. A key 54 engages in a longitudinally extending slot in column 47 to hold the latter against rotation within well 45.

A tubular T-mount comprising a horizontal tubular portion 55 and a vertical post or stem portion 56 is carried by such column, post 56 extending downwardly within the upper end of the column and such mount being supported for rotation about the axis of column 47 on bearing 57 on the upper end of such column. A clamp 58 is provided to lock such post 56 in selected rotative position. A horizontal shaft 59 is mounted for reciprocation within sleeve 60 and is adapted to be clamped in selected adjusted extended position relative thereto by means of clamp 61. Sleeve 60 is rotatively fitted within horizontal tubular portion 55 and is adapted to be clamped in selected rotative position relative thereto by means of clamp 62. A screw 63 freely rotatably mounted in end plate 64 of shaft 59 threadedly engages a nut 65 secured to sleeve 60 and protruding inwardly therefrom through a slot in shaft 59. Accordingly, by rotating screw 63 by means of an appropriate crank handle, shaft 59 may be extended or retracted relative to sleeve 60 as desired and secured in such selected position by means of clamp 61. Referring now more especially to Fig. 8, a worm gear 66 is keyed to the end of rotatable sleeve 60 and is adapted to be driven through worm 67 thus to rotate sleeve 60 and shaft 59 as desired, such sleeve and shaft thereupon being clamped in selected rotative position by means of clamp 62.

A cross-member 68 rigid with the end of shaft 59 has an upright bracket 69 mounted thereon from which is pivotally suspended a pneumatic cylinder 70 having depending rod 71 pivotally connected at its end by means of clevis 72 to a short lever arm 73 adapted to be releasably clamped to a sleeve 74 rotatably fitted within short tubular cross-piece 68. Accordingly, when such piston-cylinder assembly 71, 70, is actuated to advance and retract rod 71, it is thereby effective correspondingly to rotate sleeve 74.

Rotatably fitted within sleeve 74 is a shaft 75 to one end of which is keyed worm gear 76 engaging worm 77 mounted on sleeve 74. Rotation of such worm by means of a suitable hand crank is accordingly effective adjustably rotatively to position shaft 75 relative to such sleeve. A clamp 78 may be tightened to assist in maintaining such adjusted relationship. It will be apparent that sleeve 74 and shaft 75 will now be rotated as a unit within cross-member 68.

A housing 79 is mounted on the other end of shaft 75 rigidly therewith with a tubular sleeve 80 reciprocable therewithin. Such sleeve is held against rotation relative to housing 79 by means of key 81 and is provided with ratchet teeth engaged by pinion 82 whereby such sleeve may be reciprocated relative to housing 79 through worm 83 and worm gear 84 keyed to the shaft carrying pinion 82. A clamp 85 serves to hold such sleeve in longitudinally adjusted position. An inner tube 86 is rotatably fitted within sleeve 80 and fixedly secured to motor bracket 87 at one end thereof. An electric motor 88 is mounted on such bracket. The other end of tube 86 is rigidly secured to tubular T-member 89, and a clamp 90 is provided to secure tube 86 and accordingly motor bracket 87 and T-member 89 in selected swiveled position relative to housing 79.

A brush arbor 91 is journaled for rotation within hollow T-member 89 and may have a rotary brush such as 92 mounted adjacent one end thereof which may be provided with a suitable guard 93. The other end of shaft 91 may be provided with a magnetic brake 94 and a pulley 95 adapted to be driven from motor pulley 96 by means of V-belts 97 within guard housing 98.

A grease stick applicator may desirably be mounted on guard 93 to apply brushing compound to rotary brush 92. Such applicator 99 will desirably be designed periodically intermittently to advance the grease stick or like compound against the working face of the brush.

Referring now also to control diagram Fig. 10, the above-described brushing machine may be operated as follows. The lathe motor 5, the work head motor 33, and the L head brush drive motor 88 are each connected to a three-phase line through a manual disconnect switch 100. For setup purposes, manual operation of each component may be controlled as follows. Selector switch 101 is shifted to the "Manual" position to energize solenoid 102 to energize a valve (not shown) to admit air under pressure to pneumatic cylinder 22 and thereby advance the work holder toward arbor 4 into working position. A Warner magnetic clutch unit 35 including clutch coil 103 is likewise energized to connect motor 33 to work holder drive shaft 30 to rotate the work-piece thus presented to brush 36 on arbor 4.

Brush 92 may be rocked downwardly from a nonwork-engaging position into work-contacting position (as shown in Fig. 7, for example) by positioning selector switch 104 in the "Manual" position, thereby energizing the circuit including solenoid 105 controlling the valve for admission of air to pneumatic cylinder 70.

The work head motor 33 may be energized by depressing push button 108 which energizes the circuit including contactor 107. This motor may thereafter be stopped by depressing push button 106.

The lathe motor 5 may be energized by placing selector switch 109 in the "Manual" position and thereby energizing the circuit including three-way solenoid air valve 110 which is effective to release the air brake 9 (Fig. 4) of brush lathe arbor 4. Such actuation of selector switch 109 also serves to energize the circuit including selector switch 111, whereby the direction of lathe motor 5 may be controlled.

Movement of selector switch 112 to "Manual" position energizes the circuit including L head brush drive motor 88 and also puts power on selector switch 113 which controls the direction of rotation of such latter motor.

For automatic operation of the machine, selector switches 101, 104, 109, 112 and 114 are shifted to the "Automatic" position. The work head motor 33 is started by depressing "Start" push button 108 which energizes contactor 107. The selector switch is next turned to the "On" position which readies the electronic timer 115 for operation. A warm-up period of about 30 seconds should next be allowed before proceeding with the automatic operation.

The operator places a work-piece such as a gear to be brushed in position on the work holder head spindle or chuck 31 and then depresses timer start push button 116 which starts the timer 115. Such timer energizes the circuit including the air control solenoid 102 for work holder cylinder 22 to advance the work toward brush 36 on arbor 4, and also energizes the clutch coil 103 of clutch 35 to connect motor 33 in driving engagement with work holder drive shaft 30 to rotate such work. The lathe motor 5 is energized, as is also the L head brush drive motor 88.

When the work has been advanced into brushing position, limit switch 117 is actuated by the carriage to close the circuit including solenoid actuated valve 105, thereby to admit air under pressure to cylinder 70, causing the L head carrying brush 92 to descend into working position. When such head and brush 92 have reached working position, limit switch 118 on the head lift is actuated to energize control relay 119 which is an interlock relay serving to hold the work holder advanced in working position until the end of the time period controlled by timer 115 and also until cylinder 70 is actuated again to lift brush 92 away from the work. When the predetermined time cycle has been completed, switch 104 is opened, reversing solenoid actuated valve 105 controlling admission of air to cylinder 70 to raise brush 92, thereby releasing limit switch 118 and de-energizing control relay 119 to permit cylinder 22 to retract the work to starting position and clutch 35 to be disengaged. At the conclusion of the predetermined time cycle, timer 115 was operative to open switch 101 to de-energize solenoid 102 and thereby to reverse admission of air to cylinder 22. Similarly, such opening of switch 101 de-energized clutch coil 103 of magnetic clutch 35. The operator may then remove the finished work-piece from the work holder head or spindle 31 and replace it with a new piece requiring brushing.

The directions of rotation of brushes 36 and 92 are reversed automatically every cycle when the machine is operating automatically, such function being performed by ratchet relays 120 and 121 respectively. When complete shut-down of the machine is desired, the main disconnect switch 100 will be opened, such switch preferably being located on the face of control panel 19.

Ammeters 122 and 123 are provided in the circuits of lathe motor 5 and L head brush drive motor 88 respectively for visual observation indicative of the brushing pressure being applied by both brush 36 and brush 92. Such brushing pressure may be varied by use of the several manual mechanical adjustments provided on the machine and described above. A "safe stop" feature may desirably be included to provide the machine with low voltage or power failure protection. Control relay 124 will become de-energized in the event of either of these occurrences and will cause the machine to come to a safe stop in which all controls are returned to the normally "off" position with all motors stopped and the work holder retracted in non-working position. An emergency stop button 125 together with a reset button 126 are also provided.

Brake 94 for brush 92 is controlled by brake coil 127 and is energized when the L head and brush 92 are elevated from work-engaging position and is released when such brush is returned to work-engaging position.

As shown in certain figures of the drawing, the sliding parts of the upper brush head may be protected by means of accordion pleated boots such as 128, such devices being well known in the art. When desired, a pair of spaced brushes such as 36 may be mounted on arbor 4 adapted to engage generally diametrically opposite portions of the rotating work-piece whereby the same portions of the work-piece will be brushed in two opposite directions as the work-piece turns (see our prior Patent 2,682,065). It will be seen from the foregoing that we have provided a novel brushing machine which is highly adjustable to perform a number of different types of brushing operations upon a work-piece in an automatic or semi-automatic manner. Such machine is particularly adapted to the surface finishing of gears and like articles in a uniform manner and with a minimum of supervision.

Other modes of applying the principle of the invention may be employed, change being made as regards the details described, provided the features stated in any of the following claims or the equivalent of such be employed.

We therefore particularly point out and distinctly claim as our invention:

1. In a power brushing machine having a base frame, a horizontal brush arbor journalled in said frame, a vertical slideway on said frame, a slide mounted on said slideway, a carriage mounted on said slide for reciprocation toward and away from said arbor, work-holding means on said carriage, drive means for said arbor, and power means operative to reciprocate said carriage; a vertical column on said base frame, means for raising and lowering said column, a horizontal arm on said column, means for adjustably extending and retracting said arm, a rocker arm pivotally mounted on said first arm, power means operative to oscillate said rocker arm through a predetermined arc, a brush arbor carried by said rocker arm normal thereto, and drive means for said latter arbor on said rocker arm, said power means operative to oscillate said rocker arm being thereby effective to move a brush on said latter arbor into and out of work engaging position.

2. The machine of claim 1, including means operative to secure said horizontal arm in adjusted rotative position about its axis.

3. The machine of claim 1, including means operative to secure said horizontal arm in adjusted rotative position about its axis, and also means operative to secure said horizontal arm in adjusted rotative position about the axis of said column.

4. In a power brushing machine having a base frame, a horizontal brush arbor journalled in said frame, a vertical slideway on said frame, a slide mounted on said slideway, a carriage mounted on said slide for reciprocation toward and away from said arbor, work-holding means on said carriage, drive means for said arbor, a rotary brush mounted on said arbor, and power means operative to reciprocate said carriage to present such work to said brush and then to withdraw such work from said brush; a vertical column on said base frame, means for raising and lowering said column, a horizontal arm on said column, means for adjustably extending and retracting said arm, a rocker arm pivotally mounted on said first arm intermediate its ends, a brush arbor carried by said rocker arm adjacent one end thereof and normal thereto, a rotary brush mounted on said latter arbor, an electric motor mounted on said rocker arm adjacent its other end adapted generally to counterbalance said latter arbor and brush, drive means connecting said motor and latter arbor, means operative to secure said horizontal arm in adjusted rotative position about its axis, means operative to secure said horizontal arm in adjusted rotative position about the axis of said column, and power means operative to oscillate said rocker arm through a predetermined arc to swing said brush on said arbor carried thereby into and out of work-engaging position.

5. In a power brushing machine having a base frame, a horizontal brush arbor journalled in said frame, a vertical slideway on said frame, a slide mounted on said slideway, means operative adjustably vertically to position said slide, a transverse horizontal slideway on said vertically adjustable slide, a horizontally adjustable slide on said transverse slideway, a horizontal slideway on said latter slide at right angles to said transverse slideway, a slide mounted thereon for adjustment toward and away from said arbor, a carriage mounted on said latter slide for reciprocation toward and away from said arbor, a fluid pressure piston-cylinder assembly carried by said latter slide operative thus to reciprocate said carriage a predetermined distance toward and away from said arbor, work holding means on said carriage, a rotary brush mounted on said arbor in position to engage work thus advanced theretoward, drive means for said arbor, and means on said carriage operative to rotate such work; a vertical column supported on said base frame, means for raising and lowering said column, a head mounted on said column for swiveling action about the axis of the latter, lock means for securing said head in desired adjusted position, a horizontal arm mounted in said head for lengthwise adjustment and rotative adjustment about its longitudinal axis, means for securing said arm in desired adjusted positions, a rocker arm pivotally mounted on said first arm intermediate its ends for oscillation about an axis normal to said horizontal arm, a brush arbor carried by said rocker arm adjacent one end thereof and normal thereto, a rotary brush mounted on said latter arbor, an electric motor mounted on said rocker arm adjacent its other end adapted generally to counterbalance said latter arbor and brush, drive means connecting said motor and latter arbor, a fluid pressure piston-cylinder assembly mounted on said horizontal arm operative to oscillate said rocker arm through a predeterbined arc to swing said brush on said arbor carried thereby into and out of work-engaging position, means mounting said rocker arm for rotative adjustment about its longitudinal axis, and means mounting said rocker arm for longitudinal adjustment relative to its pivotal mounting on said horizontal arm.

6. The machine of claim 5, including timer actuated control means operative to stop rotation of said work-rotating means when said carriage is reciprocated to withdraw the work from engagement with said brush on said horizontal arbor, to reverse the direction to brush arbor drive of each said arbor before a work-piece is again brought into engagement with the respective brushes thereon, and to actuate said piston-cylinder assembly on said horizontal arm to swing said brush on said rocker arm into engagement with such work after such work has been advanced into engagement with said brush on said horizontal arbor and to swing said brush on said rocker arm away from such work prior to withdrawal of such work from engagement with said brush on said horizontal arbor.

7. In a power brushing machine having a base frame, a brush arbor journalled in said frame and adapted to have a rotary brush mounted thereon, a work support, and means operative to reciprocate said support to move such work into and out of brush engaging position; power means on said base frame supporting a second brush arbor for swinging movement to carry a brush mounted thereon into and out of position to engage such work when the latter has been reciprocated into position to engage such brush on said first arbor; and means supporting said second brush arbor for adjustable swinging movement to change the angular position of the axis of rotation of said second brush arbor with respect to the axis of rotation of said first brush arbor.

8. The machine of claim 7, including control means automatically operative to swing said second brush arbor and brush thereon away from such work prior to retraction of said work support and to swing said second brush arbor and brush into work engaging position after said support is again advanced to present such work to the brush on said first arbor.

9. In a power brushing machine having a base frame, a brush arbor journalled in said frame and adapted to have a rotary brush mounted thereon, a work support, and means operative to reciprocate said support to move such work into and out of brushing engaging position; power means on said base frame supporting a second brush arbor for swinging movement to carry a brush mounted thereon into and out of position to engage such work when the latter has been reciprocated into position to engage such brush on said first arbor; and control means automatically operative to swing said second brush arbor and brush thereon away from such work prior to retraction of said work support and to swing said second brush arbor and brush into work engaging position after said support is again advanced to present such work to the brush on said first arbor, and means automatically operative to stop rotation of said brush arbors and then to drive them in the opposite direction when such brushes are thus out of engagement with such work.

10. In a power brushing machine including a brush arbor journalled for rotation about a stationary axis and adapted to have a rotary brush mounted thereon; work supporting means operative intermittently to present a work-piece to such brush for performance of a brushing operation thereon, a second brush arbor adapted to have a rotary brush mounted thereon and mounted for movement to bring such latter brush into engagement with such work-piece and power means operative intermittently to move said second arbor to bring the brush thereon into engagement with such work-piece when such work-piece is presented to such first brush; and means supporting said second brush arbor for adjustable swinging movement to change the angular position of the axis of rotation of said second brush arbor with respect to the axis of rotation of said first brush arbor.

11. In a power brushing machine, two rotary brush arbors journalled at an angle to each other, a work support, brushes on said respective arbors adapted simultaneously to engage such work, means operative first to move one of said arbors in an arcuate path to carry the brush mounted thereon out of work-engaging position, means adapted thereafter to shift said work support to carry such work out of engagement with the other said brush, and means supporting said one arbor for adjustable swinging movement to change the angular position of the axis of rotation of the brush thereon with respect to the axis of rotation of said other arbor.

12. In a power brushing machine, two rotary brush arbors, a work support, brushes on said respective arbors adapted simultaneously to engage such work, means operative first to swing one of said arbors to carry the brush mounted thereon out of work-engaging position, means adapted thereafter to shift said work support to carry such work out of engagement with the other said brush, and means supporting said one arbor for adjustable swinging movement to change the angular position of the axis of rotation of the brush thereon with respect to the axis of rotation of said other arbor.

13. In a power brushing machine having a base frame, a brush arbor journalled in said frame and adapted to have a rotary brush mounted thereon, a work support, and means operative to reciprocate said support to move such work into and out of brush engaging position; power means on said base frame supporting a second brush arbor for movement to carry a brush mounted thereon into and out of position to engage such work; and means supporting said second brush arbor for adjustable swinging movement to change the angular position of the axis of rotation of said second brush arbor with respect to the axis of rotation of said first brush arbor.

14. The machine of claim 13 including control means automatically operative to move said second brush arbor and brush thereon away from such work prior to retraction of said work support and to move said second brush arbor and brush into work engaging position after said support is again advanced to present such work to the brush on said first arbor.

References Cited in the file of this patent

UNITED STATES PATENTS

| | | |
|---|---|---|
| 2,206,842 | Indge | July 2, 1940 |
| 2,310,870 | Retterath | Feb. 9, 1943 |
| 2,682,065 | Nelson et al. | June 29, 1954 |
| 2,707,851 | Strong | May 10, 1955 |
| 2,718,732 | Comstock | Sept. 27, 1955 |

FOREIGN PATENTS

| | | |
|---|---|---|
| 474,371 | Great Britain | Oct. 25, 1937 |